(12) United States Patent
Sornborger

(10) Patent No.: US 12,140,807 B2
(45) Date of Patent: Nov. 12, 2024

(54) POSITIONING DEVICE AND ALIGNMENT FIXTURE FOR LINEAR OPTICAL FIBER ARRAY

(71) Applicant: Nufern, East Granby, CT (US)

(72) Inventor: Nathan Sornborger, Harwinton, CT (US)

(73) Assignee: Nufern, East Granby, CT (US)

( * ) Notice: Subject to any disclaimer, the term of this patent is extended or adjusted under 35 U.S.C. 154(b) by 221 days.

(21) Appl. No.: 17/990,367

(22) Filed: Nov. 18, 2022

(65) Prior Publication Data

US 2023/0194799 A1    Jun. 22, 2023

Related U.S. Application Data

(60) Provisional application No. 63/290,844, filed on Dec. 17, 2021.

(51) Int. Cl.
*G02B 6/42* (2006.01)
*G02B 6/36* (2006.01)
*G02B 6/40* (2006.01)

(52) U.S. Cl.
CPC ......... *G02B 6/4226* (2013.01); *G02B 6/3616* (2013.01); *G02B 6/366* (2013.01); *G02B 6/406* (2013.01)

(58) Field of Classification Search
None
See application file for complete search history.

(56) References Cited

U.S. PATENT DOCUMENTS

| | | | |
|---|---|---|---|
| 4,691,586 A | * | 9/1987 | van Leijenhorst ... F16M 11/043 74/490.09 |
| 7,199,924 B1 | | 4/2007 | Brown et al. |
| 2001/0017956 A1 | | 8/2001 | Goodman et al. |

(Continued)

FOREIGN PATENT DOCUMENTS

DE     3246359 A  *  6/1984  ......... F16M 11/2014

OTHER PUBLICATIONS

Zhang et al., (2013). "CW 50W/M2=10.9 diode laser source by spectral beam combining based on a transmission grating," Optics Express, 21(3):3627-3632.

(Continued)

*Primary Examiner* — Chad H Smith
(74) *Attorney, Agent, or Firm* — Morrison & Foerster LLP

(57) ABSTRACT

A fixture for aligning a linear array of optical fiber terminators includes a base and a heightwise stack of positioning devices disposed on the base. Each positioning device includes an anchor secured to a lengthwise wall of a bracket coupled to the base, a terminator holder flexibly coupled to the anchor and having a lengthwise channel for holding a respective optical fiber terminator, and actuators controlling position and yaw of the terminator holder in a plane orthogonal to the heightwise direction. The terminator holder has planar top and bottom surfaces that define a height of the terminator holder and interface with the terminator holder of any adjacent positioning device. The fixture also includes a clamp for clamping the positioning device stack against the base after setting the in-plane position and yaw of each terminator holder. Individual positioning devices may be adjusted or replaced without disturbing the rest of the stack.

23 Claims, 6 Drawing Sheets

(56) References Cited

U.S. PATENT DOCUMENTS

| | | |
|---|---|---|
| 2002/0006247 A1 | 1/2002 | Vaganov |
| 2003/0063838 A1 | 4/2003 | Hagood et al. |
| 2004/0184708 A1 | 9/2004 | Ghandi et al. |
| 2006/0093269 A1* | 5/2006 | Willis .................... G02B 7/003 385/52 |
| 2011/0142441 A1 | 6/2011 | Wellbrock et al. |
| 2020/0174265 A1 | 6/2020 | Nguyen et al. |

OTHER PUBLICATIONS

Invitation to Pay Additional Fees and Partial Search Report and Opinion received for International Patent Application No. PCT/US2022/081250 mailed on Feb. 24, 2023, 10 pages.

* cited by examiner

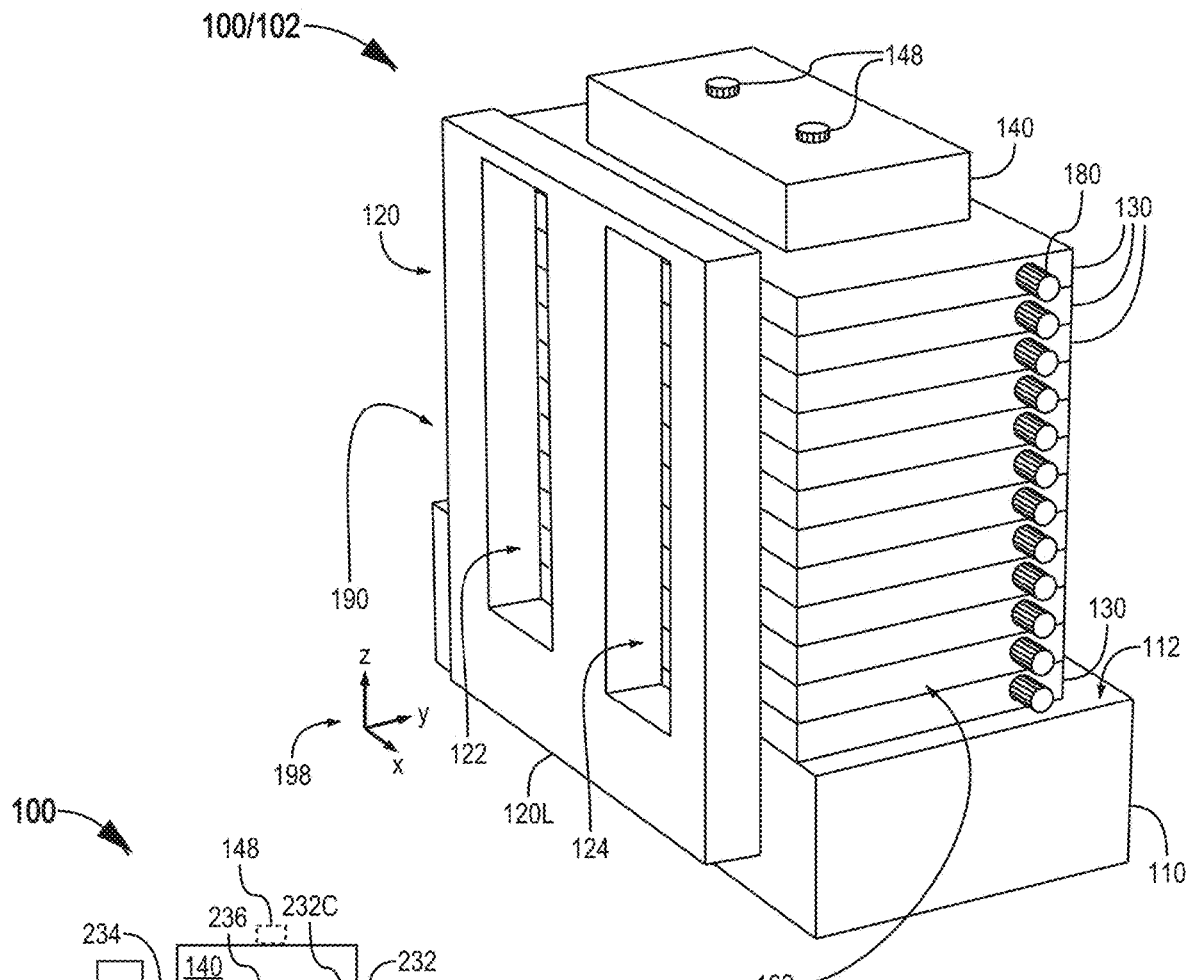
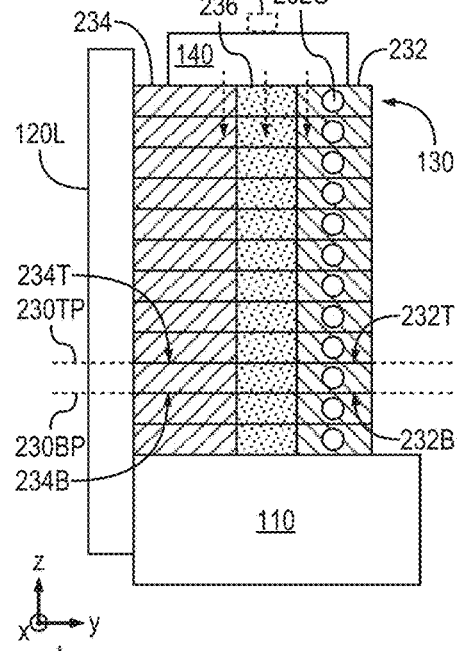
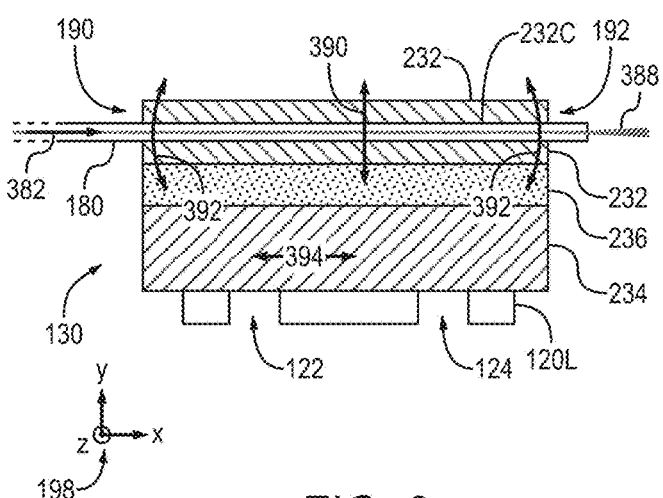
FIG. 1
FIG. 2
FIG. 3

POSITIONING DEVICE AND ALIGNMENT FIXTURE FOR LINEAR OPTICAL FIBER ARRAY

PRIORITY

This application claims priority to U.S. Provisional Patent Application Ser. No. 63/290,844, filed Dec. 17, 2021, the contents of which are incorporated herein by reference it its entirety.

TECHNICAL FIELD OF THE INVENTION

The present invention relates to the combination of the output of multiple optical fibers. The present invention relates in particular to systems for holding an array of optical fiber terminators to precisely align their respective output beams.

DISCUSSION OF BACKGROUND ART

An optical fiber array is a bundle of optical fiber ends arranged in a one- or two-dimensional array, usually with the fiber ends facing nominally in the same direction. Light is coupled into or out of the fiber array. Fiber arrays are used in telecommunications to couple laser light from multiple fibers into integrated photonic circuits, e.g., optical silica-on-silicon circuits. In this application, multiple fiber ends are typically positioned in a solid structure, such as a one-dimensional array of parallel grooves in a substrate, designed to orient the fiber ends parallel to each other. In other applications, the output of a fiber array is directed to free-space optics. For example, a plurality of separate laser beams, each emerging from a respective fiber of a fiber array, may be combined into a single, common laser beam using free-space optical elements. Such beam combination may be used to form a more powerful laser beam than achievable from a single laser source.

A variety of laser applications rely on high laser power, particularly in materials processing and laser machining. As compared to conventional materials processing/machining tools, lasers are uniquely capable of highly local energy delivery and can thus perform processing and machining tasks with greater precision than conventional tools, and in many cases also with greater speed and convenience. As such, high-power laser beams are used to, e.g., weld, cut, sinter, and harden metals in a clean, precise, and efficient fashion. These processes may benefit from average laser powers in the range of several to many kilowatts (kW). It may be impossible to obtain sufficient laser power from a single laser source. For example, the average power of a high-power fiber laser is typically no more than a few kW, and generally less than one kW for single-mode fiber lasers. Higher laser powers may be achieved by combining the output of several individual lasers. Fiber arrays are used in different types of beam combination, including coherent beam combination, spectral beam combination, and spatial combination of incoherent beams.

In coherent beam combination, several laser beams of identical frequency and phase are combined. A setup for "side-by-side" coherent beam combination typically has a lens array that matches a fiber array feeding the combiner. The laser beam from each fiber is allowed to diverge until nearly overlapping with the neighboring laser beam(s), and then collimated by a respective lens of the lens array to form an individual collimated laser beam. All these mutually coherent, collimated laser beams then propagate parallel to each other as a single, larger laser beam. Alternatively, in "filled-aperture" coherent beam combination, several laser beams are directed onto the same spot on a diffraction grating from different angles, with mutual coherence of the individual laser beams resulting in the diffraction grating generating a single, combined beam.

Spectral beam combination utilizes a wavelength-sensitive beam combiner, such as a prism or a diffraction grating, to combine several laser beams of different respective frequencies. The individual laser beams are directed onto the wavelength-sensitive beam combiner at input angles that cooperate with wavelength-sensitive deflection by the beam combiner to overlay the individual laser beams on each other. The individual laser beams may be delivered by a fiber array. In one type of spectral beam combination systems, a linear array of parallel-propagating, diverging laser beams, obtained from a fiber array, pass through a single, common lens that (a) directs the laser beams to the same area of a diffraction grating, (b) collimates each individual laser beam, and (c) transforms the initial transverse offsets between the individual laser beams to corresponding differences in incidence angle onto the diffraction grating. With proper selection of wavelengths, transverse offsets, lens focal length, and diffraction grating properties, the individual laser beams are combined into a single laser beam with multiple co-propagating spectral components.

SUMMARY OF THE INVENTION

Disclosed herein is a positioning device for holding and positioning an optical fiber terminator in a linear fiber array, as well as a related alignment fixture for holding and aligning fiber terminators in a linear fiber array. The alignment fixture includes a plurality of instances of the positioning device stacked on top of each other to position a respective plurality of fiber terminators in a linear array. The stack of positioning devices is clamped against a base after alignment of each individual positioning device of the stack. The fixture is therefore robust against vibration, and also provides a good thermal pathway for conducting heat away from the fiber terminators. The interfaces between adjacent positioning devices of the stack allow for adjustment, and even replacement, of any individual one of the positioning devices without adversely impacting the alignment of the rest of the stack.

The present positioning device and alignment fixture are suitable for use in beam combination, both coherent beam combination and spectral beam combination. The present positioning device and alignment fixture are particularly useful for beam combination requiring precise alignment of the individual laser beams. In beam combination setups, the space at the light-emitting end of the fiber array is often crowded due to beam combination optics. In certain embodiments of the present fixture and devices, alignment of the positioning devices in the fixture may be accomplished with no need to access the space at the light-emitting end of the fiber array. In these embodiments, full alignment can be accomplished from the light-receiving end and one side of the fixture between the light-receiving and light-emitting ends.

In one aspect, a fixture for holding and aligning a linear array of optical fiber terminators includes a base and a bracket coupled to the base. The bracket extends from the base in a heightwise direction and includes a lengthwise wall oriented along a lengthwise direction. The fixture further includes a heightwise stack of positioning devices disposed on the base. Each positioning device includes an anchor secured to the lengthwise wall, and a terminator holder flexibly coupled to the anchor and having a lengthwise channel for holding a respective optical fiber terminator. The terminator holder has two planar surfaces orthogonal to the heightwise direction and facing in two opposite heightwise directions, respectively. The two planar surfaces define a heightwise extent of the terminator holder and interface with the terminator holder of any adjacent positioning device of the stack. Each positioning device further includes a plurality of actuators cooperatively configured to control in-plane position and yaw of the terminator holder in a first plane orthogonal to the heightwise direction. The fixture also includes a clamp for clamping the positioning devices against each other and clamping the stack against the base after setting the in-plane position and yaw of each terminator holder using the respective actuators.

In another aspect, a device for positioning an optical fiber terminator in a linear optical fiber array includes a terminator holder having (a) planar top and bottom surfaces parallel to respective top and bottom planes bounding a heightwise extent of the terminator holder in a heightwise dimension orthogonal to the top and bottom planes, and (b) a channel for accommodating the optical fiber terminator. The channel passes through the holder in a lengthwise direction. The device also includes an anchor for mounting the device to a support bracket. The anchor is offset from the terminator holder in a widthwise direction. The device further includes a flexure mechanism forming an extension spring between the terminator holder and the anchor. The flexure mechanism allows rotation and translation of the terminator holder, relative to the anchor, in directions parallel to the top and bottom planes. In addition, the device includes a pair of actuation screws threaded through the anchor and contacting the terminator holder to control the rotation and translation of the terminator holder by pressing against the terminator holder to extend the extension spring formed by the flexure mechanism.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIG. 1 illustrates an alignment fixture for a fiber array, according to an embodiment. The alignment fixture includes a stack of positioning devices, each configured to hold and position a respective optical fiber terminator.

FIG. 2 is an elevation view of the alignment fixture of FIG. 1.

FIG. 3 is a cross-sectional view of a positioning device secured to a bracket in the alignment fixture of FIG. 1, according to an embodiment.

DETAILED DESCRIPTION OF THE INVENTION

Figure 4:
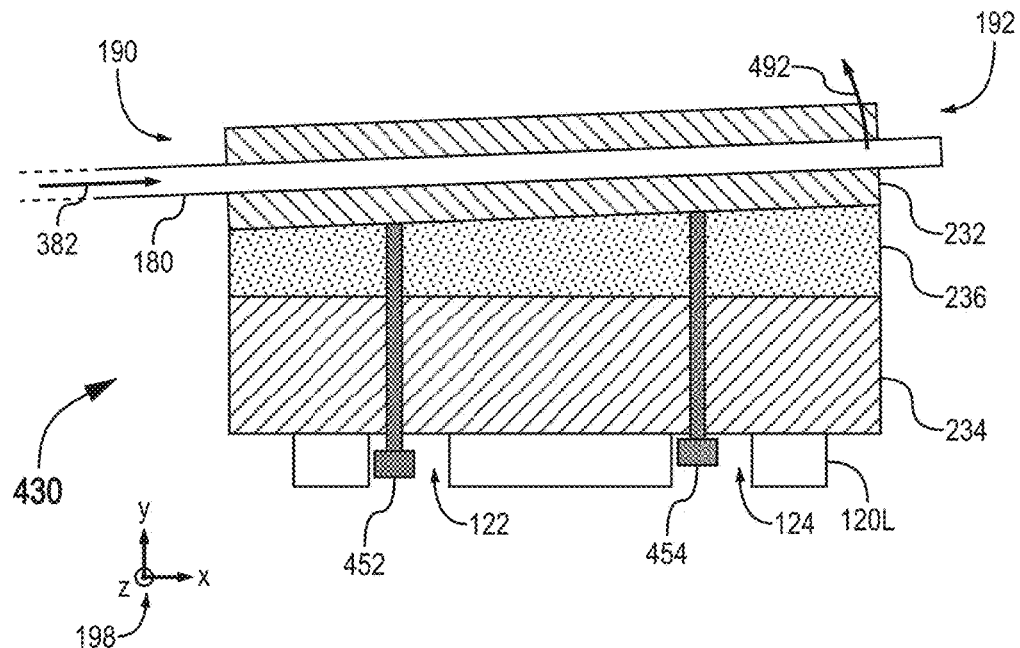
FIG. 4 shows a positioning device with actuators for controlling adjustment of widthwise position and in-plane yaw of a fiber terminator holder, according to an embodiment.

Referring now to the drawings, wherein like components are designated by like numerals, FIG. 1 illustrates one alignment fixture 100 for a fiber array 102. Fixture 100 includes a stack of positioning devices 130, each configured to hold and position a respective optical fiber terminator 180. Each fiber terminator 180 includes the end of an optical fiber, optionally terminated with one or more optical elements, such as an endcap. Fiber array 102 is a linear fiber array that includes fixture 100 and a linear array of fiber terminators 180, wherein each fiber terminator 180 is secured in and positioned by a respective positioning device 130.

Fixture 100 may be provided as a standalone system configured to accept a separately sourced plurality of fiber terminators 180. Similarly, positioning device 130 may be provided as a standalone device configured to accept a separately sourced fiber terminator 180 and position this fiber terminator 180 in a separately sourced fixture 100.

FIG. 1 shows a right-handed cartesian coordinate system 198 having orthogonal x, y, and z-axes. The x, y, and z-axes indicate lengthwise, widthwise, and heightwise dimensions, respectively, with respect to fixture 100. Positioning devices 130 are arranged in a heightwise stack in fixture 100.

In addition to positioning devices 130, fixture 100 includes a base 110, a bracket 120, and a clamp 140. Positioning devices 130 are stacked on a surface 112 of base 110. Surface 112 may be planar. Bracket 120 is coupled to base 110 and extends from base 110 in a heightwise direction (in the positive z-axis direction). Bracket 120 includes a lengthwise wall 120L (oriented along the x-axis). Bracket 120 may further include other walls and features not shown in FIG. 1. Each positioning device 130 is secured to lengthwise wall 120L. Clamp 140 presses (a) positioning devices 130 against each other and (b) the stack of positioning devices 130 against base 110.

Fixture 100 may include one or more screws 148 that pass through clamp 140 and positioning devices 130 and are threaded into base 110 to press clamp 140 in the direction toward base 110. Alternatively, clamp 140 is pressed against the stack of positioning devices 130 via another mechanism, for example using an arm coupled to bracket 120.

Fixture 100 has a light-receiving end 190 and a light-emitting end 192. In operation, when fiber terminators 180 are implemented in fixture 100, light propagates through fiber terminators 180 from light-receiving end 190 to light-emitting end 192. FIG. 1 shows light-emitting end 192, while light-receiving end 190 is hidden from view. In the example depicted in FIG. 1, each fiber terminator 180 extends out of the light-emitting end of the respective positioning device 130. Alternatively, the end of one or more fiber terminators 180 may coincide with the light-emitting end of the respective positioning device(s) 130, or one or more fiber terminators 180 may end slightly recessed into the respective positioning device(s) 130. Without departing from the scope hereof, fixture 100 may be implemented as a mirror image of the embodiment depicted in FIG. 1, wherein the mirror image is a reflection in the xz-plane.

FIG. 2 is an elevation view of fixture 100 showing light-emitting end 192. FIG. 3 is a cross-sectional view of one positioning device 130 secured to lengthwise wall 120L in fixture 100, with the cross section being taken in a plane parallel to the length- and widthwise dimensions. The views of FIGS. 2 and 3 are mutually orthogonal. FIG. 3 shows positioning device 130 with a fiber terminator 180 secured therein. FIG. 3 also shows light propagation through fiber terminator 180. In operation, light propagates through fiber terminator 180 along a propagation direction 382 and emerges from fiber terminator 180 at the light-emitting end 192 as a beam 388. Beam 388 is typically diverging due to diffraction.

Each positioning device 130 includes an anchor 234 and a terminator holder 232 flexibly coupled to anchor 234 via a flexible element 236. Although FIGS. 1, 2, and 3 show each positioning device 130 as having a rectangular footprint in the xy-plane, positioning device 130 may have a more complex, non-rectangular shape. In fixture 100, anchor 234 is secured to lengthwise wall 120L. Holder 232 has a lengthwise channel 232C (see FIG. 2) passing through holder 232 from the light-receiving end to the light-emitting end. Channel 232C is configured to accommodate a fiber terminator, as shown in FIG. 3 where fiber terminator 180 occupies channel 232C.

Flexible element 236 allows for some degree of both (a) widthwise translation of holder 232 relative to anchor 234, as indicated by arrow 390 in FIG. 3 and (b) rotation of holder 232 relative to anchor 234 in a length- and widthwise plane, as indicated by arrows 392 in FIG. 3. Flexible element 236 thereby allows for adjustment of the widthwise position and "in-plane" yaw of holder 232 in a length- and widthwise plane (orthogonal to the heightwise direction of the stack of positioning devices 130). Hereinafter, "in-plane" refers to being in a length- and widthwise plane, that is, in a plane that is parallel to the xy-plane of coordinate system 198. Lengthwise wall 120L further allows for lengthwise translation of each positioning device 130, as indicated by arrow 394 in FIG. 3. Consequently, the design of positioning devices 130 and bracket 120 allows for adjustment of the in-plane position (both widthwise and lengthwise) and yaw of each fiber terminator 180 of fiber array 102.

Flexible element 236 may include one or more flexures, springs, and/or elastomers. In certain embodiments, flexible element 236 is rigid against out-of-plane distortion, that is, distortion in the heightwise directions. In embodiments of positioning device 130 implementing flexible element 236 as one or more flexures, holder 232, anchor 234, and flexible element 236 may be integrally formed. For example, holder 232, anchor 234, and flexible element 236 may be a single, integrally formed metal part.

Although for clarity not shown in FIGS. 1, 2, and 3, positioning devices 130 and fixture 100 are equipped with actuators that control the in-plane position and yaw of each holder 232, and thus of the corresponding fiber terminators 180. These actuators may be implemented in many different ways. In certain embodiments, the actuators are arranged such that the in-plane position and yaw of terminator holder 232 can be fully controlled from (a) the side of positioning devices 130 where lengthwise wall 120L is located and (b) light-receiving end 190 of fixture 100. Lengthwise wall 120L may have one or more apertures, for example apertures 122 and 124 shown in FIGS. 1 and 3, to accommodate at least some of these actuators and allow operation thereof.

FIG. 4 shows, in cross-sectional view, one positioning device 430 with actuators for controlling adjustment of the widthwise position and in-plane yaw of a fiber terminator holder. Positioning device 430 is an embodiment of positioning device 130 that includes two widthwise-oriented actuator screws 452 and 454. Screws 452 and 454 are lengthwise offset from each other.

FIG. 4 shows positioning device 430 as mounted to lengthwise wall 120L in an embodiment of fixture 100, with apertures 122 and 124 accommodating screws 452 and 454, respectively, and access thereto. Each of screws 452 and 454 passes through anchor 234 to contact holder 232. Screws 452 and 454 also pass through an intervening portion of flexible element 236 if any portion of flexible element 236 is in the path of screws 452 and 454, as shown in FIG. 4. Each of screws 452 and 454 is threaded into at least a portion of anchor 234, and can thus be screwed in the positive y-axis direction to push against holder 232. Flexible element 236 essentially acts as an extension spring between anchor 234 and holder 232, wherein the extension spring allows for some amount of in-plane rotation of holder 232. Herein, the term "extension spring" refers to a part that can be extended, wherein both generating extension and maintaining such extension requires application of force in the direction of the extension. A coil spring is a well-known example but other structures, such as elastomers and flexures, can form extension springs as well.

In the configuration shown in FIG. 4, screw 454 has been screwed further into anchor 234 than screw 452, such that the light-emitting end of holder 232 is pivoted away from anchor 234, as indicated by arrow 492. By coordinating the operation of screws 452 and 454, screws 452 and 454 may effect widthwise translation and/or in-plane rotation of holder 232 within certain ranges. The amount of yaw displayed in FIG. 4 is greater than what is typically necessary.

Figure 5:
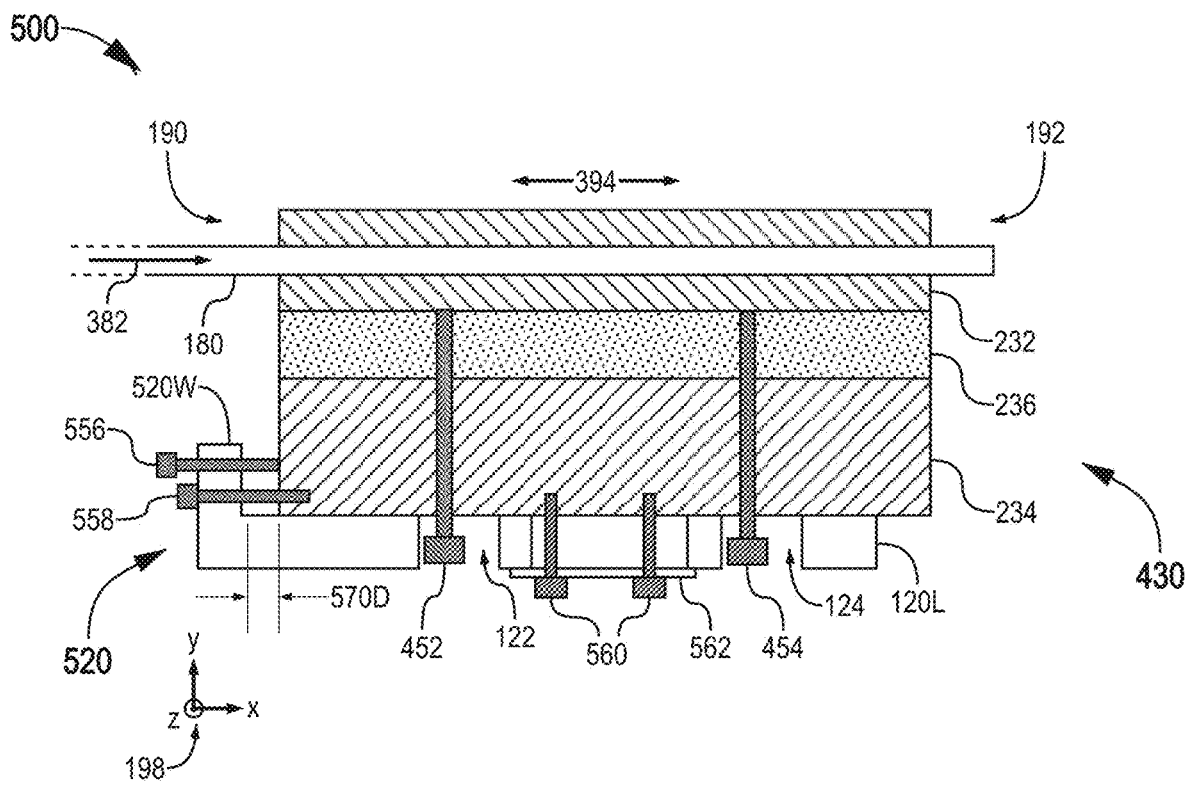
FIG. 5 shows the positioning device of FIG. 4 mounted to a bracket that is configured to aid in lengthwise translation of the positioning device in an alignment fixture, according to an embodiment.

FIG. 5 shows, in cross-sectional view, positioning device 430 mounted to a bracket 520 that is configured to aid in lengthwise translation of positioning device 430 in an alignment fixture 500. Fixture 500 is an embodiment of fixture 100. Bracket 520 is an embodiment of bracket 120 that further includes a widthwise wall 520W, such that bracket 120 wraps around at least some of anchor 234 at the light-receiving end of each positioning device 430. Each positioning device 430 is a lengthwise distance 570D away from widthwise wall 520W. Distance 570D is adjustable by one or more actuators. Different positioning devices 430 may be set at different distances 570D.

In the embodiment shown in FIG. 5, each positioning device 430 is lengthwise actuated by a respective pair of screws 556 and 558 of fixture 500. Screw 556 is a push-screw that is threaded through widthwise wall 520W to push against anchor 234 in the positive x-axis direction. Screw 558 is a pull-screw that passes through widthwise wall 520W and is threaded into anchor 234 to pull anchor 234 in the negative x-axis direction. Screws 556 and 558 may be replaced by other types of actuators, for example a push-screw and a spring between widthwise wall 520W and anchor 234, or a single push-pull-screw locked to one of widthwise wall 520W and anchor 234 and threaded into the other one of widthwise wall 520W and anchor 234.

The lengthwise position of each positioning device 430 may be locked by fixing positioning device 430 to lengthwise wall 120L. For example, as shown in FIG. 5, fixture 500 includes one or more screws 560. Each screw 560 passes through a lengthwise slot in lengthwise wall 120L and is threaded into anchor 234. Screw(s) 560 serve to secure positioning device 130 to lengthwise wall 120L. However, during lengthwise adjustment of the position of positioning device 430, the lengthwise positions of screws 560 shift with positioning device 130. Thus, during such adjustment, each screw 560 is sufficiently loose to allow lengthwise translation of positioning device 430 along lengthwise wall 120L. Screw(s) 560 may further help guide such lengthwise translation and prevent inadvertent widthwise movement. Once the lengthwise position of positioning device 430 is set as desired, screw(s) 560 may be tightened to lock this lengthwise position and fully secure positioning device 130 to lengthwise wall 120L. Fixture 500 may further include a washer 562 to help secure screw(s) 560 to lengthwise wall 120L.

Referring again to fixture 100 and FIGS. 1, 2, and 3, adjustment of the in-plane position and yaw of any one of positioning devices 130 in the stack may take place without disturbing the in-plane position and yaw of the other positioning devices 130 of the stack. Holder 232 of each positioning device has a planar top surface 232T and a planar bottom surface 232B. Surfaces 232T and 232B are orthogonal to the heightwise dimension, face in opposite heightwise directions, and define the heightwise extent of holder 232. Additionally, top surface 232T of each positioning device 130, except the uppermost positioning device 130, interfaces with bottom surface 232B of the above adjacent positioning device 130. Due to the planarity of surfaces 232T and 232B, holders 232 of adjacent positioning devices 130 can slide relative to each other in in-plane directions, as long as the position of holder 232 is not otherwise locked, e.g., by clamp 140, screws 560, and/or screws 556 and 558.

In the embodiment depicted in FIGS. 1 and 2, anchor 234 of each positioning device 130 has a planar top surface 234T and a planar bottom surface 234B. Surface 234T is coplanar with surface 232T of the corresponding holder 232, with both of surfaces 232T and 234T being located in a common top plane 230TP of positioning device 130. Similarly, surface 234B is coplanar with surface 232B of the corresponding holder 232, with both of surfaces 232B and 234B being located in a common bottom plane 230BP of positioning device 130. The corresponding flexible element 236 is heightwise bounded by planes 230TP and 230BP. In one example, the heightwise extent of flexible element 236 is less than the distance between planes 230TP and 230BP. In another example, flexible element 236 spans from plane 230TP and to plane 230BP, and may have planar top and bottom surfaces. In the depicted embodiment, each positioning device 130 can slide relative to any adjacent positioning device 130 in any in-plane direction, as long as the position of the positioning device 130 is not otherwise locked, e.g., by actuator screws and/or locking screws (such as those discussed in reference to FIGS. 4 and 5) or by clamp 140.

Therefore, when clamp 140 is not engaged, it is possible to adjust the length- and widthwise positions and in-plane yaw of each positioning device 130 independently of other positioning devices of the stack. During in-plane adjustment of an individual positioning device 130, this positioning device 130 occupies the same heightwise space and thus fulfills its role in structurally supporting the heightwise stack of positioning devices 130. As a result, in-plane adjustment of an individual positioning device 130 may be accomplished without disturbing other positioning devices 130 of the stack. After such adjustment, clamp 140 can be engaged to lock the in-plane positions and yaw of all positioning devices 130 of the stack. Engagement of clamp 140 does not significantly alter the heightwise positions of positioning devices 130, but rather prevents relative in-plane movement of adjacent positioning devices 130 by increasing friction therebetween. Furthermore, when clamp 140 is not engaged, it is possible to remove one or more individual positioning devices 130 from the stack without disturbing the rest of the stack, as long as positioning devices 130 adjacent to the one(s) being removed, are secured to bracket 120, for example by screws 560 of FIG. 5. In short, in the event that an individual positioning device 130 of the stack needs to be adjusted, repaired, inspected, or replaced, this task can be performed without having to re-align the other positioning devices 130 of the stack.

In a modification of the embodiment depicted in FIG. 2, each anchor 234 has non-planar top and bottom surfaces. For example, each anchor 234 may have a heightwise protrusion in its top surface and a heightwise recess in its bottom surface, with adjacent anchors 234 interfacing in a tongue-and-groove fashion that allows for lengthwise translation of adjacent anchor 234 relative to each other.

In addition, FIG. 2 shows the interface between adjacent positioning devices 130 as being a direct interface, i.e., with adjacent positioning devices 130 being in direct physical contact with each other. Alternatively, without altering the above description of properties and advantages of fixture 100, these interfaces may be indirect and include a planar spacer between adjacent positioning devices 130, although such spacers would likely be an unnecessary complication.

Figure 6:
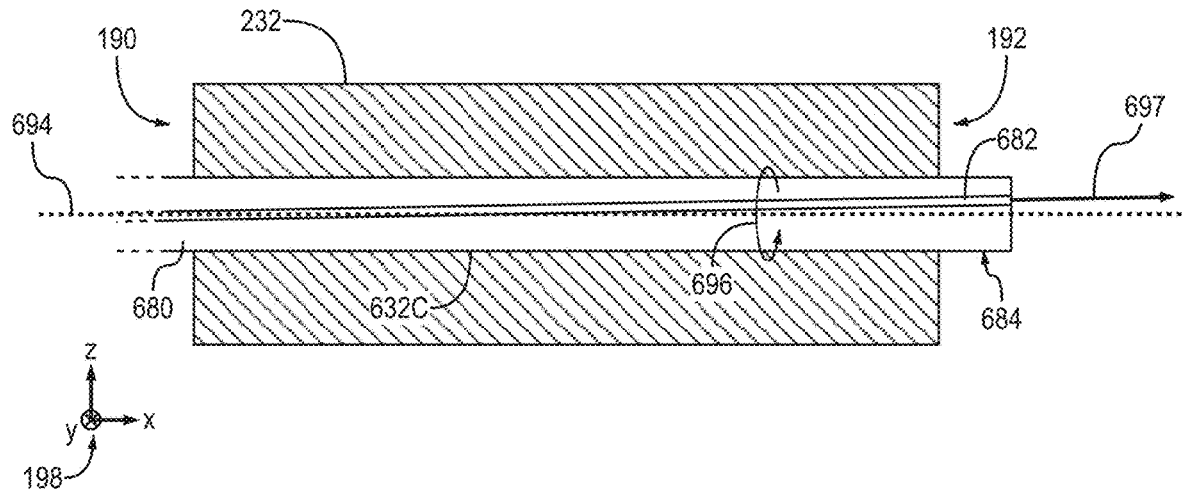
FIG. 6 illustrates adjustment of the pitch of a fiber terminator in the positioning device of FIGS. 1, 2, and 3, according to an embodiment.

FIG. 6 illustrates adjustment of the pitch of a fiber terminator 680 in holder 232 of positioning device 130. FIG. 6 shows holder 232 with a fiber terminator 680 placed in a cylindrical channel 632C of holder 232. Channel 632C is an embodiment of channel 232C, and fiber terminator 680 is an example of fiber terminator 180. Fiber terminator 680 has a light-guiding core 682, and a cylindrical outer surface 684 that is substantially complementary to the surface of channel 632C. Core 682 is at an oblique angle to a longitudinal center axis of cylindrical surface 684. The pointing direction 697 of light emerging from fiber terminator 680 is therefore sensitive to rotation 696 of fiber terminator 680 in channel 632C. Thus, rotation of fiber terminator 680 can be used to align pointing direction 697. In a typical scenario, it is preferred that pointing direction 697 has zero pitch relative to the xy-plane. However, a non-zero pitch relative to the xy-plane is achievable as well, if so desired.

Most practical fiber terminators will exhibit a non-zero angle between the light guiding core and the outer terminator surface, at least due to manufacturing tolerances. The oblique angle shown in FIG. 6 is exaggerated for clarity, and the actual angle between core 682 and surface 684 is generally significantly smaller.

Without departing from the scope hereof, surface 684 may have a slightly smaller diameter than the surface of channel 632C so as to prevent stiction of fiber terminator 680 in channel 632C. Additionally, surface 684 may be interrupted by recessed portions of fiber terminator 680, and the surface of cylindrical channel 632C may similarly be interrupted by recesses into the body of holder 232 and/or imperfections.

Figure 7:
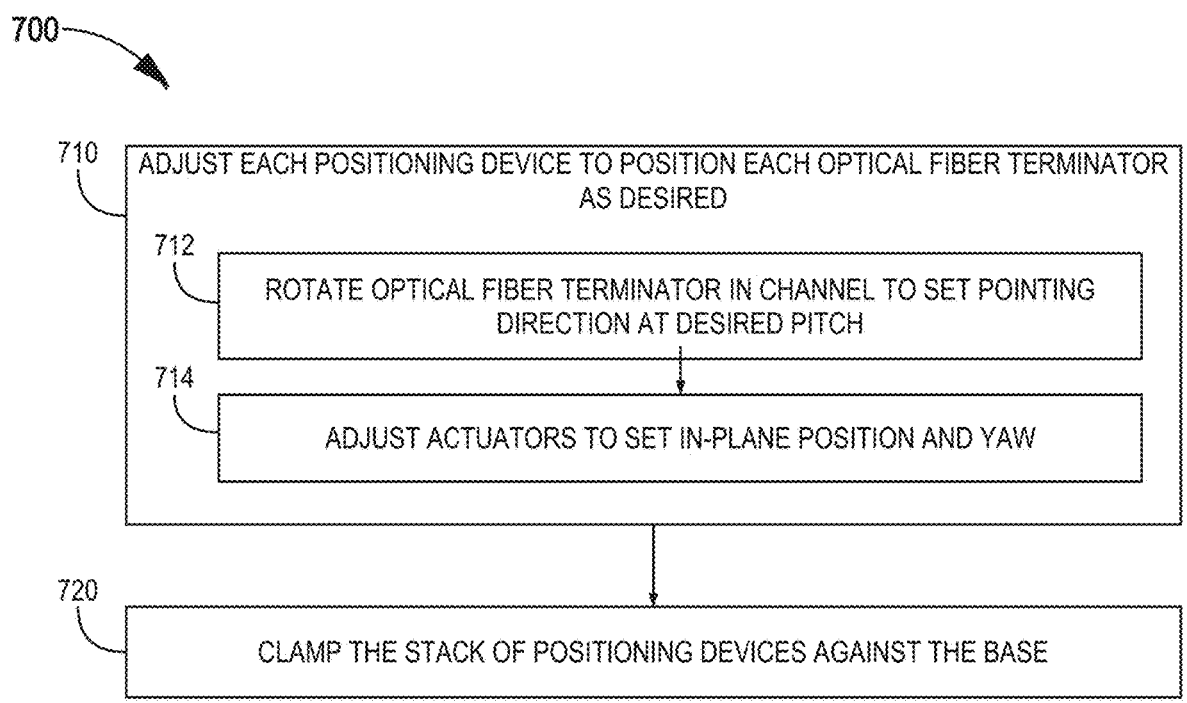
FIG. 7 is a flowchart for a method for aligning an array of fiber terminators in the alignment fixture of FIGS. 1 and 2, according to an embodiment.

FIG. 7 is a flowchart for one method 700 for aligning an array of fiber terminators 680 in fixture 100 of fiber array 102. Method 700 includes steps 710 and 720. Step 710 adjusts each positioning device 130 to position each corresponding fiber terminator 680 as desired. Step 710 includes performing steps 712 and 714 for each fiber terminator 680. Step 712 rotates fiber terminator 680 in channel 632C of the holder 232 of the corresponding positioning device 130 to set pointing direction 697 at a desired pitch. After having achieved the desired pitch in step 712, step 714 adjusts actuators of positioning device 130 (e.g., the actuators discussed above in reference to FIGS. 4 and 5) to set the in-plane positions and yaw as desired. Step 714 usually includes compensating for yaw introduced by pitch adjustment in step 712. After completion of steps 712 and 714 for all positioning devices 130 in step 710, step 714 clamps the stack of positioning devices 130 with clamp 140.

Figure 8A:
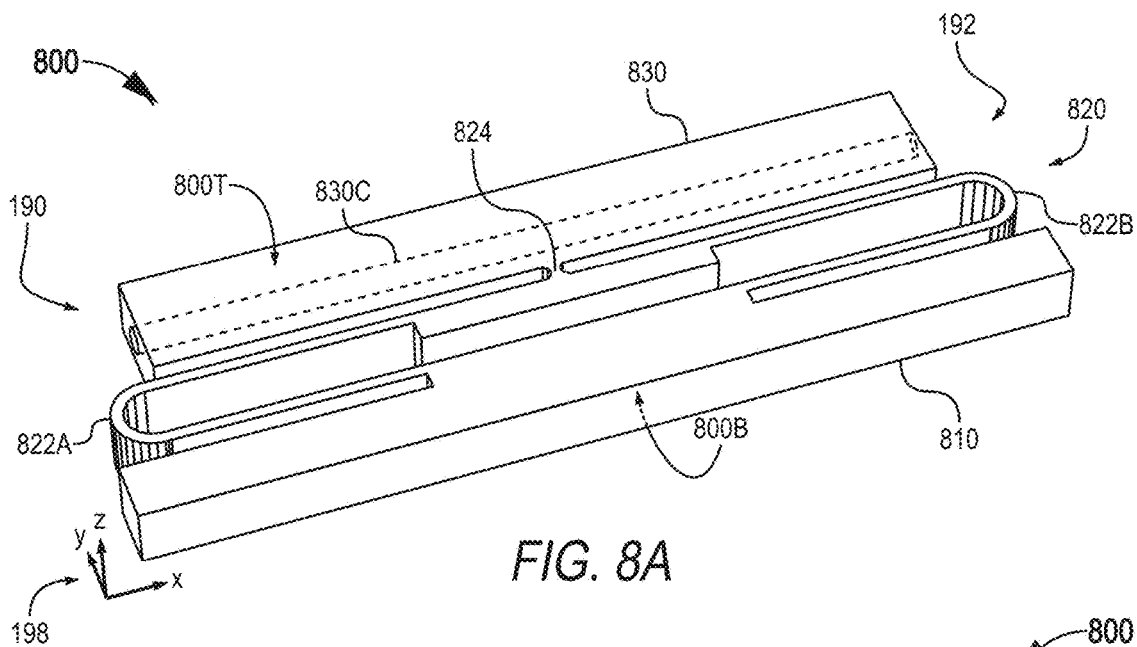
FIGS. 8A-C illustrate an integrally formed structure that includes an anchor, a flexure mechanism, and a terminator holder, and is configured for implementation in the positioning device of FIGS. 1, 2, and 3, according to an embodiment.
Figure 8B:
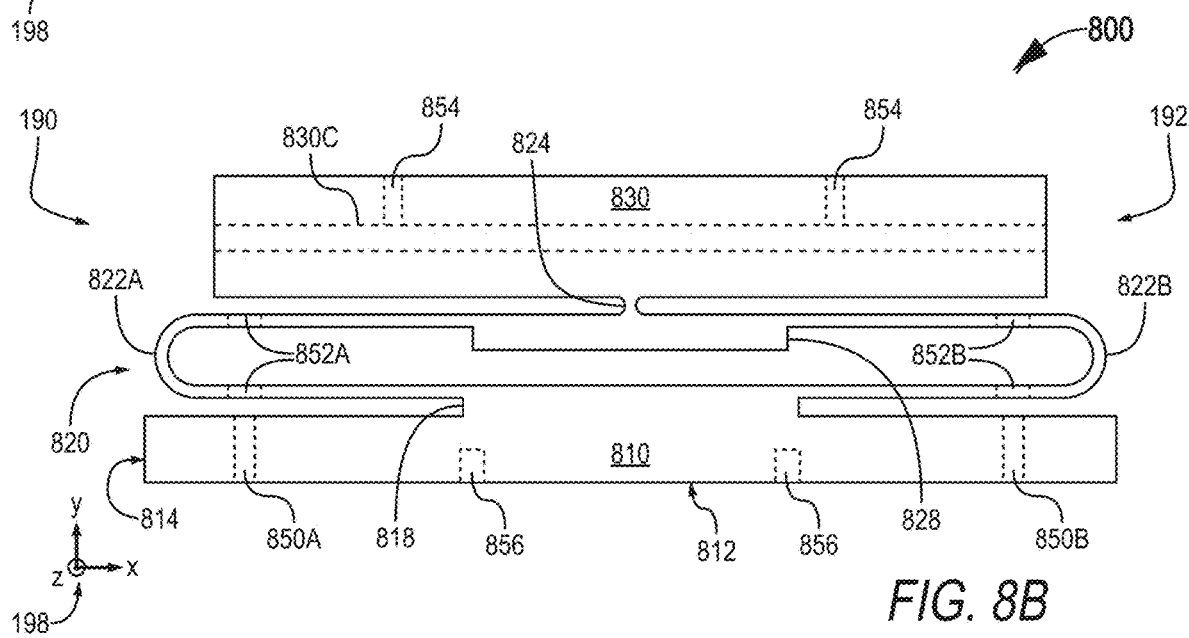
Figure 8C:
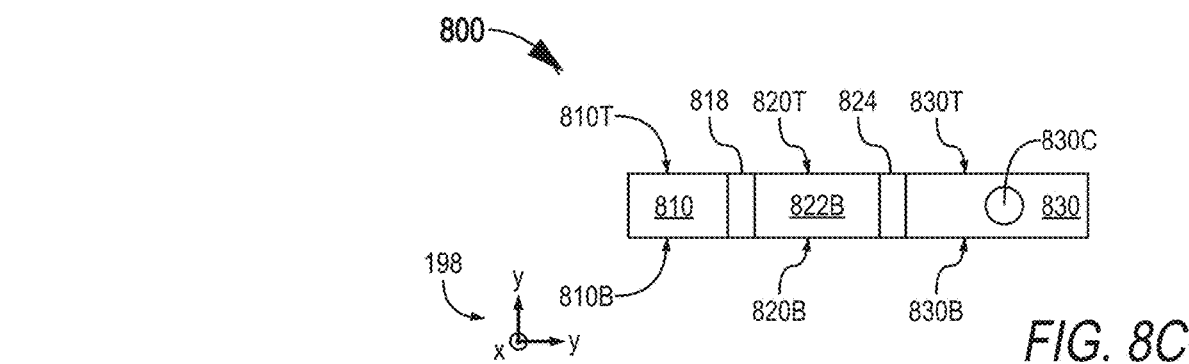

FIGS. 8A-C illustrate one integrally formed structure 800 that includes an anchor 810, a flexure mechanism 820, and a terminator holder 830, and is configured for implementation in positioning device 130. Anchor 810, flexure mechanism 820, and a terminator holder 830 are embodiments of anchor 234, flexible element 236, and holder 232, respectively. A planar surface 812 of anchor 810 is configured to couple to lengthwise wall 120L of bracket 120 in fixture 100. Structure 800 may be made of metal. FIG. 8A is a perspective view of structure 800. FIG. 8B is a top view of structure 800, further indicating interior channels/screw holes in dashed outline. FIG. 8C is a view of light-emitting end 192 of structure 800.

Holder 830 has a channel 830C configured to accommodate fiber terminator 180. Channel 830C may be cylindrical. Holder 830 may further have one or more threaded holes 854 that reach channel 830C from the side of holder 830 farthest from anchor 810. A related embodiment of positioning device 130, based on structure 800, includes one or more set screws, each threaded into a respective threaded hole 854 to secure fiber terminator 180 in channel 830C, for example after rotating fiber terminator 180 in step 712 of method 700.

Flexure mechanism 820 includes two compliant hairpin-shaped flexures 822A and 822B, and a single-axis flexure hinge 824. Flexure hinge 824 allow for pivoting of holder 830 in the xy-plane. Flexures 822A and 822B are arranged in a racetrack-like configuration and accommodate changes in the widthwise distance between anchor 810 and holder 830. Flexures 822A and 822B may also accommodate some amount of in-plane rotation of holder 830, although such rotation may be mostly accommodated by flexure hinge 824. Flexure mechanism 820 is essentially rigid against distortion out of the xy-plane. The coupling 818 between flexure mechanism 820 and anchor 810 may be rigid. Optionally, flexure mechanism 820 is reinforced between flexure hinge 824 and flexures 822A and 822B by a rigid portion 828.

Anchor 810 may have threaded holes 850A and 850B to accommodate actuator screws 452 and 454, respectively (see FIG. 4). In the lengthwise dimension, threaded holes 850A and 850B are on opposite sides of the coupling points between (a) flexure mechanism 820 and (b) anchor 810 and holder 830. This positioning of threaded holes 850A and 850B allows for efficient in-plane pivoting of holder 830. In the example depicted in FIGS. 8A and 8B, flexure mechanism 820 is longer in the lengthwise dimension than holder 830, such that actuator screws 452 and 454 must pass through flexures 822A and 822B in order to reach holder 830. For this purpose, flexures 822A and 822B may have respective through-holes 852A and 852B. In other examples, not depicted, flexures 822A and 822B are shorter, such that actuator screws 452 and 454 can pass by, rather than through, flexure mechanism 820. Anchor 810 may also have one or more threaded holes 856 that, when structure 800 is implemented in fixture 100, face lengthwise wall 120L. Each hole 856 can accommodate a respective screw 560 (see FIG. 5). The end surface 814 of anchor 810 at the light-receiving end 190 of structure 800 may couple with one or more actuators for lengthwise translation of structure 800 in fixture 100, such as screws 556 and 558 discussed above in reference to FIG. 5.

As seen in FIGS. 8A and 8C, structure 800 has a planar top surface 800T and a planar bottom surface 800B (hidden from view in FIG. 8A). Anchor 810 has planar top and bottom surfaces 810T and 810B, respectively. Flexure mechanism 820 has planar top and bottom surfaces 820T and 820B, respectively. Holder 830 has planar top and bottom surfaces 830T and 830B, respectively. Top surfaces 810T, 820T, and 830T are coplanar and form respective portions of planar top surface 800T. Bottom surfaces 810B, 820B, and 830B are coplanar and form respective portions of planar bottom surface 800B. Coupling 818 and flexure hinge 824 may span between surfaces 800T and 800B, as shown in FIG. 8C.

Structure 800 can be implemented on a wide range of size scales. In certain embodiments, the length of structure 800 in the x-dimension is in the range between 30 and 100 millimeters (mm), the width of structure 800 in the y-dimension is in the range between 10 and 30 mm, and the height of structure 800 in the z-dimension is in the range between 2 and 10 mm.

Structure 800 may be machined out of a single, solid metal block. In one example, structure 800 is formed partly by wire erosion. In a modification, structure 800 is composed of two or more parts coupled to each other. For example, flexure mechanism 820 may be manufactured as a separate part and then assembled with separately manufactured versions of anchor 810 and holder 830. However, the integrally formed structure 800 offers advantages in terms of manufacturing cost and consistency, as well as eliminates assembly steps.

Figure 9:
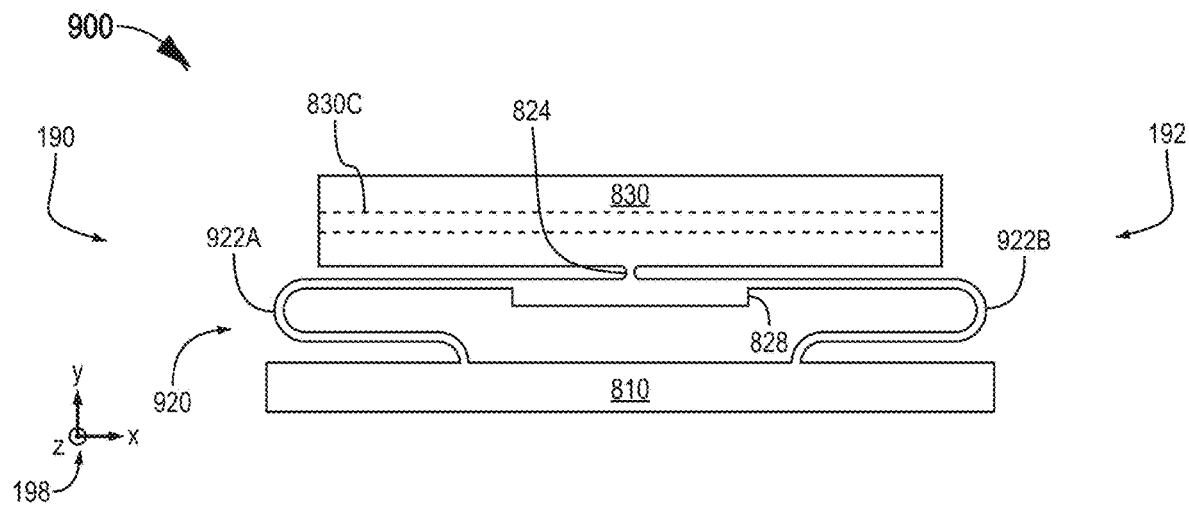
FIG. 9 illustrates another integrally formed structure that includes an anchor, a flexure mechanism, and a terminator holder, and is configured for implementation in the positioning device of FIGS. 1, 2, and 3, according to an embodiment.

FIG. 9 illustrates another integrally formed structure 900 that includes anchor 810, a flexure mechanism 920, and terminator holder 830, and is configured for implementation in positioning device 130. FIG. 9 shows structure 900 in top view, similar to that used for structure 800 in FIG. 8B. Structure 900 is similar structure 800 except for implementing a flexure mechanism 920 with two flexures separately connected to anchor 810. As compared to structure 800, flexure mechanism 920 replaces flexure mechanism 820. Flexure mechanism 920 includes single-axis flexure hinge 824 and two flexures 922A and 922B. Each of flexures 922A and 922B connects to anchor 810 at two different locations rather than via the common coupling 818 of structure 800.

Structure 900 is just one of many possible modifications of structure 800. Other possible modifications include more complex shapes of flexures, additional flexures, and flexures with sharp corners rather than curved bends.

Although not shown in FIG. 9, structure 900 may include some or all of holes 854, 850A, 850B, 852A, 852B, and 856 discussed above in reference to FIG. 8.

Figure 10:
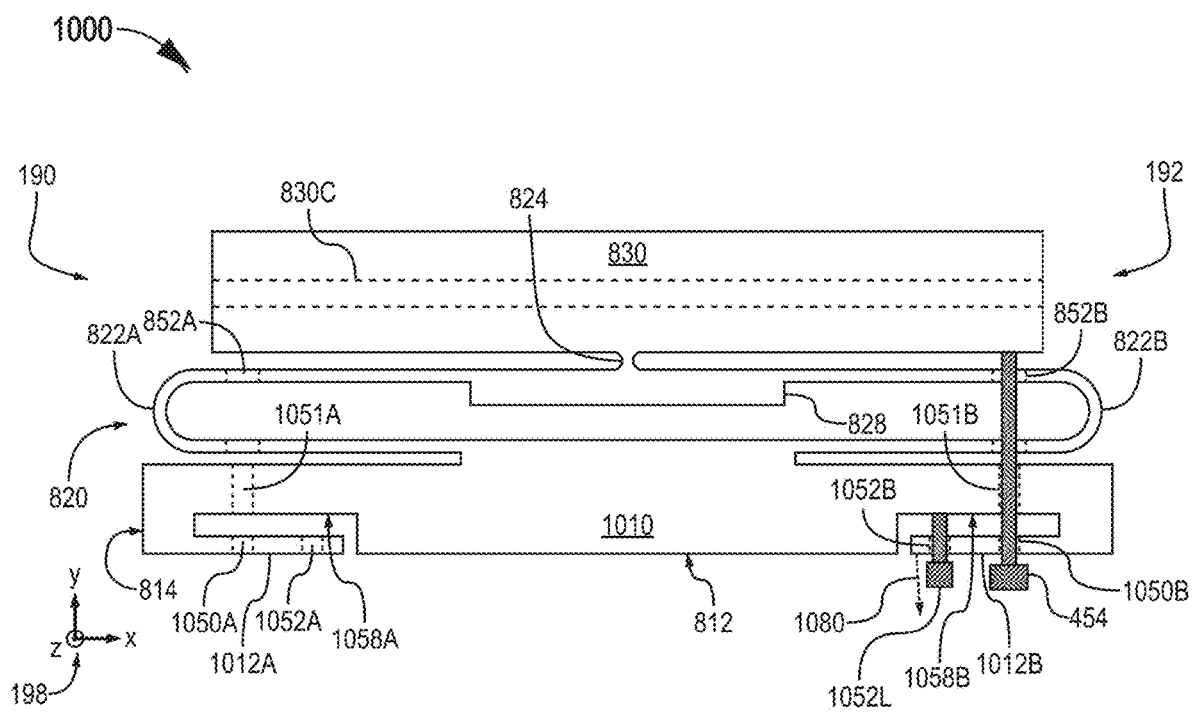
FIG. 10 illustrates yet another integrally formed structure that has an anchor, a flexure mechanism, and a terminator holder and is configured for implementation in the positioning device of FIGS. 1, 2, and 3, according to an embodiment. The structure of FIG. 10 includes wings for locking actuator screws.

FIG. 10 illustrates yet another integrally formed structure 1000 that has an anchor, a flexure mechanism, and a terminator holder and is configured for implementation in positioning device 130. Structure 1000 is an extension of structure 800 that further includes wings for locking actuator screws 452 and 454. As compared to structure 800, structure 1000 implements an anchor 1010 with wings 1012A and 1012B.

When implemented in positioning device 130 and fixture 100, actuator screw 452 passes through both (a) wing 1012A via a hole 1050A and (b) the main body of anchor 810 via a hole 1051A. In one example, actuator screw 452 is threaded into hole 1051A. Alternatively, actuator screw 452 is threaded into hole 1050A or both of holes 1050A and 1051B. Similarly, actuator screw 454 passes through both (a) wing 1012B via a hole 1050B and (b) the main body of anchor 810 via a hole 1051B, with actuator screw 454 being threaded into one or both of holes 1050B and 1051B. For clarity of illustration, FIG. 10 shows actuator screw 454 but not actuator screw 452. Referring now to actuator screw 454 and wing 1012B, a locking screw 1052L is threaded into a threaded hole 1052B of wing 1012B and contacts a surface 1058B of the main body of anchor 1010. Surface 1058B faces wing 1012B. In an example of step 714 of method 700, actuator screws 452 and 454 are adjusted to set the widthwise position and yaw of holder 830, whereafter locking screw 1052L is threaded sufficiently far through wing 1012B to force wing 1012B in the direction 1080 away from the main body of anchor 1010. Wing 1012B thereby crimps actuator screw 454 in hole 1050B to lock actuator screw 454. A second locking screw 1052L performs the same function in wing 1012A to lock actuator screw 452.

Anchor 1010 may be modified to have wings 1012A and 1012B on the side of anchor 1010 facing flexure mechanism 820 instead of on the side of anchor 1010 forming surface 812.

Without departing from the scope hereof, in each of structures 800, 900, and 1000, the flexure mechanism may have the opposite widthwise orientation than shown in FIGS. 8A-10, such that single-axis flexure hinge 824 connects the flexure mechanism to the anchor rather than the terminator holder. Furthermore, in each of structures 800 and 1000, the flexure mechanism may be connected to both the terminator holder and the anchor via a respective single-axis flexure hinge.

Figure 11:
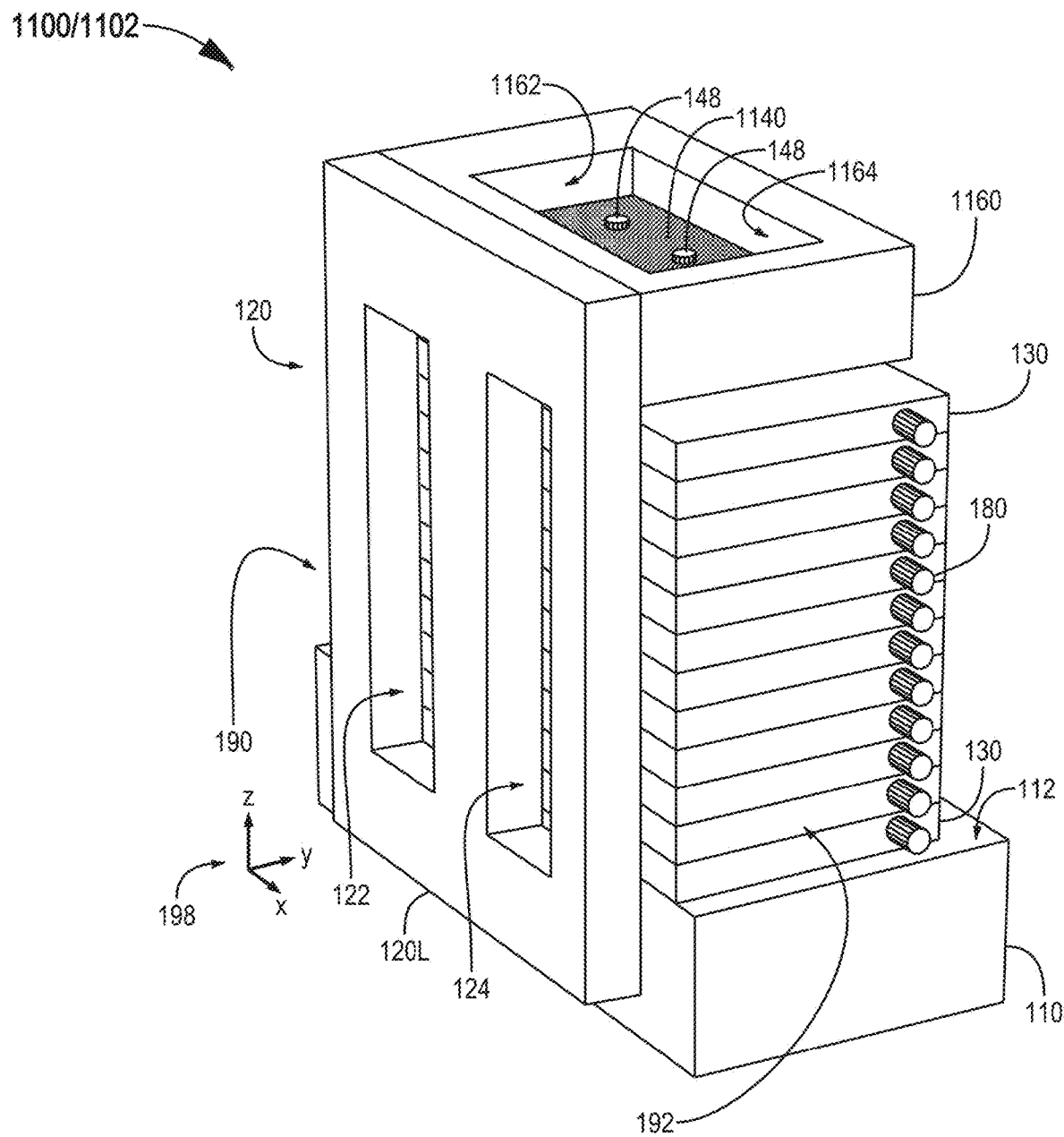
FIG. 11 illustrates an alignment fixture, and associated fiber array, with a guide that restricts movement of a clamp, according to an embodiment.

FIG. 11 illustrates a fixture 1100, and associated fiber array 1102, that includes a guide configured to restrict movement of a clamp 1140 to heightwise translation. Clamp 1140 is an embodiment of clamp 140 shaped as a plate that is (a) oriented along the width- and lengthwise dimensions and (b) has vertical sidewalls parallel to the heightwise dimension. Fixture 1100 is an embodiment of fixture 100, and fiber array 1102 is a corresponding embodiment of fiber array 102. Fixture 1100 includes a guide 1160 that is coupled to bracket 120. Clamp 1140 is positioned in an aperture of guide 1160 having walls that are parallel to the heightwise dimension. In the example depicted in FIG. 11, clamp 1140 has a rectangular footprint, and guide 1160 has two widthwise walls 1162 and two lengthwise walls 1164 to form an aperture that is complementary in shape to clamp 1140. (Only one widthwise wall 1162 and one lengthwise wall 1164 is visible in FIG. 11.) Guide 1160 prevents in-plane movement of clamp 1140 and allows only heightwise translation thereof. Guide 1160 thereby helps prevent clamp 1140 from disturbing the in-plane position and yaw of positioning devices 130 during the process of pressing clamp 1140 against the stack of positioning devices 130.

The present invention is described above in terms of a preferred embodiment and other embodiments. The invention is not limited, however, to the embodiments described and depicted herein. Rather, the invention is limited only by the claims appended hereto.

What is claimed is:

1. A fixture for holding and aligning a linear array of optical fiber terminators, comprising:
a base;
a bracket coupled to the base and extending from the base in a heightwise direction, the bracket including a lengthwise wall oriented along a lengthwise direction;
a heightwise stack of positioning devices disposed on the base, each positioning device including:
an anchor secured to the lengthwise wall;
a terminator holder flexibly coupled to the anchor and having a lengthwise channel for holding a respective optical fiber terminator, the terminator holder having two planar surfaces orthogonal to the heightwise direction, respectively, the two planar surfaces defining a heightwise extent of the terminator holder and interfacing with the terminator holder of any adjacent positioning device of the stack, and
a plurality of actuators cooperatively configured to control in-plane position and yaw of the terminator holder in a first plane orthogonal to the heightwise direction; and
a clamp for clamping the positioning devices against each other and clamping the stack against the base after setting the in-plane position and yaw of each terminator holder using the respective actuators.

2. The fixture of claim 1, wherein adjacent positioning devices of the stack are in direct contact with each other.

3. The fixture of claim 1, wherein:
the terminator holder of each positioning device is offset from the corresponding anchor in a widthwise direction away from the lengthwise wall; and
each positioning device includes a flexure mechanism that (a) couples the terminator holder to the anchor and (b) is configured to accommodate changes, as effected by the actuators, to in-plane position and yaw of the terminator holder relative to the anchor.

4. The fixture of claim 1, wherein the actuators of each positioning device are controllable either from a side of the positioning device where the lengthwise wall is located or from a light-receiving side of the positioning device, and wherein the actuators of each positioning device are cooperatively configured to control the in-plane position and yaw of the corresponding terminator holder.

5. The fixture of claim 1, wherein the anchor of each positioning device has two planar surfaces coplanar with the two planar surfaces of the corresponding terminator holder, respectively, and wherein the two planar surfaces of the anchor define a heightwise extent of the anchor and interfaces with the anchor of any adjacent positioning device of the stack.

6. The fixture of claim 1, wherein the base includes a planar surface, parallel to the first plane, for supporting the stack of positioning devices.

7. The fixture of claim 1, wherein the actuators of each positioning device include:
a pair of widthwise-actuators for controlling (a) a widthwise position of the respective optical fiber terminator in a widthwise dimension and (b) the yaw of the respective optical fiber terminator, the widthwise-actuators being controllable from a side of the positioning device where the lengthwise wall is located; and
one or more lengthwise-actuators for controlling a lengthwise position of the respective optical fiber terminator, each lengthwise-actuator being controllable from a light-receiving side of the positioning device.

8. The fixture of claim 7, wherein each positioning device is secured to the lengthwise wall by one or more screws passing through the lengthwise wall via one or more respective lengthwise slots in the lengthwise wall, to fix the lengthwise position of the positioning device against the lengthwise wall.

9. The fixture of claim 7, wherein:
the bracket further has a widthwise-oriented wall on the light-receiving side of the positioning devices; and
for each positioning device, the one or more lengthwise-actuators being coupled between the widthwise-oriented wall and configured to control distance between the widthwise wall and a light-receiving end of the respective positioning device.

10. The fixture of claim 1, wherein the clamp includes a plate oriented parallel to the first plane and having side walls orthogonal to the first plane, the fixture further comprising:
a guide coupled to the bracket on an opposite side of the stack of positioning devices than the base and configured to restrict movement of the plate to heightwise directions.

11. The fixture of claim 10, further comprising at least one clamping screw for pressing the plate against the stack of positioning devices, each clamping screw passing through the plate and the stack to be threaded into the base.

12. A linear optical fiber array, comprising:
the fixture of claim 1, the channel of each positioning device being cylindrical in shape; and
a plurality of optical fiber terminators, each seated in the channel of a respective positioning device and each including:
a cylindrical exterior surface complementary to the cylindrical shape of the channel, and
a core for guiding light through the optical fiber terminator, the core being at an oblique angle to a cylinder axis of the cylindrical exterior surface such that a pointing direction of light emerging from the optical fiber terminator is sensitive to rotation of the optical fiber terminator in the channel.

13. A method for aligning the linear optical fiber array of claim 12, comprising steps of:
adjusting each of the positioning devices to position each of the optical fiber terminators as desired; and
clamping the stack against the base with the clamp after the adjusting step to stabilize the positioning devices;
wherein, for each of the positioning devices, the adjusting step includes steps of:
rotating the respective optical fiber terminator in the associated channel to set the pointing direction at a desired pitch with respect to the lengthwise direction, and
after the rotating step, adjusting the actuators to set the in-plane position and yaw of the optical fiber terminator.

14. A device for positioning an optical fiber terminator in a linear optical fiber array, comprising:
a terminator holder having:
planar top and bottom surfaces parallel to respective top and bottom planes bounding a heightwise extent of the terminator holder in a heightwise dimension orthogonal to the top and bottom planes, and
a channel for accommodating the optical fiber terminator, the channel passing through the holder in a lengthwise direction;
an anchor for mounting the device to a support bracket, the anchor being offset from the terminator holder in a widthwise direction;
a flexure mechanism forming an extension spring between the terminator holder and the anchor, the flexure mechanism allowing rotation and translation of the terminator holder, relative to the anchor, in directions parallel to the top and bottom planes; and
a pair of actuation screws threaded through the anchor and contacting the terminator holder to control the rotation and translation of the terminator holder by pressing against the terminator holder to extend the extension spring formed by the flexure mechanism.

15. The device of claim 14, wherein the flexure mechanism is bounded by the top and bottom planes.

16. The device of claim 14, wherein the anchor has planar top and bottom surfaces contained in the top and bottom planes, respectively.

17. The device of claim 14, wherein the holder, the anchor, and the flexure mechanism are respective portions of a single, integrally formed part.

18. The device of claim 14, wherein the flexure mechanism is rigid against distortion non-parallel to the top and bottom planes.

19. The device of claim 14, wherein each actuation screw is oriented widthwise, and the actuation screws are lengthwise offset from each other such that, with respect to the lengthwise direction, coupling points from the flexure mechanism to the anchor and the terminator holder are between the actuation screws.

20. The device of claim 19, wherein:
the anchor includes (a) a main body connected to the flexure mechanism and (b) a pair of wings at lengthwise opposite ends of the main body, the main body and the wings being integrally formed with each other, lengthwise extent of each wing overlapping with lengthwise extent of the main body;
each actuation screw passes through the main body and a respective wing, and is threaded to at least one of the main body and the respective wing; and
the device further includes a pair of widthwise-oriented locking screws for locking the pair of actuation screws, respectively, each locking screw being configured to flex a respective wing relative to the main body so as to crimp a respective actuation screw.

21. The device of claim 14, wherein each actuation screw further passes through the flexure mechanism.

22. The device of claim 14, wherein the flexure mechanism includes:
a single-axis flexure hinge coupled to one of the anchor and the holder; and
one or more flexures coupled between the single-axis flexure hinge and the other one of the anchor and the holder;
wherein each of the single-axis flexure hinge and the one or more flexures is rigid against distortion non-parallel to the top and bottom planes.

23. The device of claim 22, wherein:
the one or more flexures include two hairpin-shaped flexures lengthwise offset from each other and each coupled rigidly to the anchor, and
the single-axis flexure hinge couples the two hairpin-shaped flexures to the terminator holder.

* * * * *